June 12, 1956 C. S. ASH 2,750,226
RAMP TRAILER
Filed June 15, 1953 3 Sheets-Sheet 1
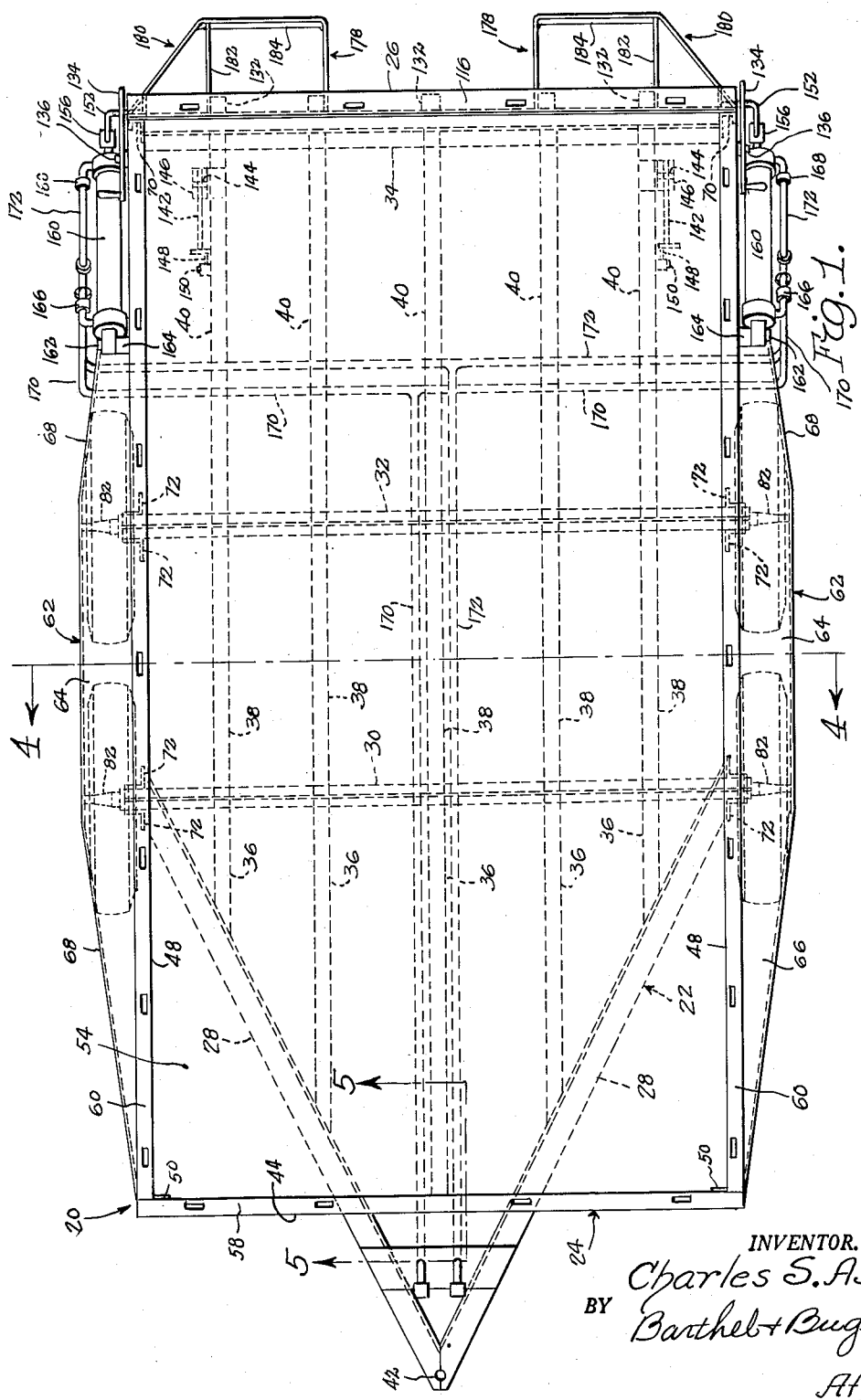
INVENTOR.
Charles S. Ash
BY Barthel + Bugbee
Attys

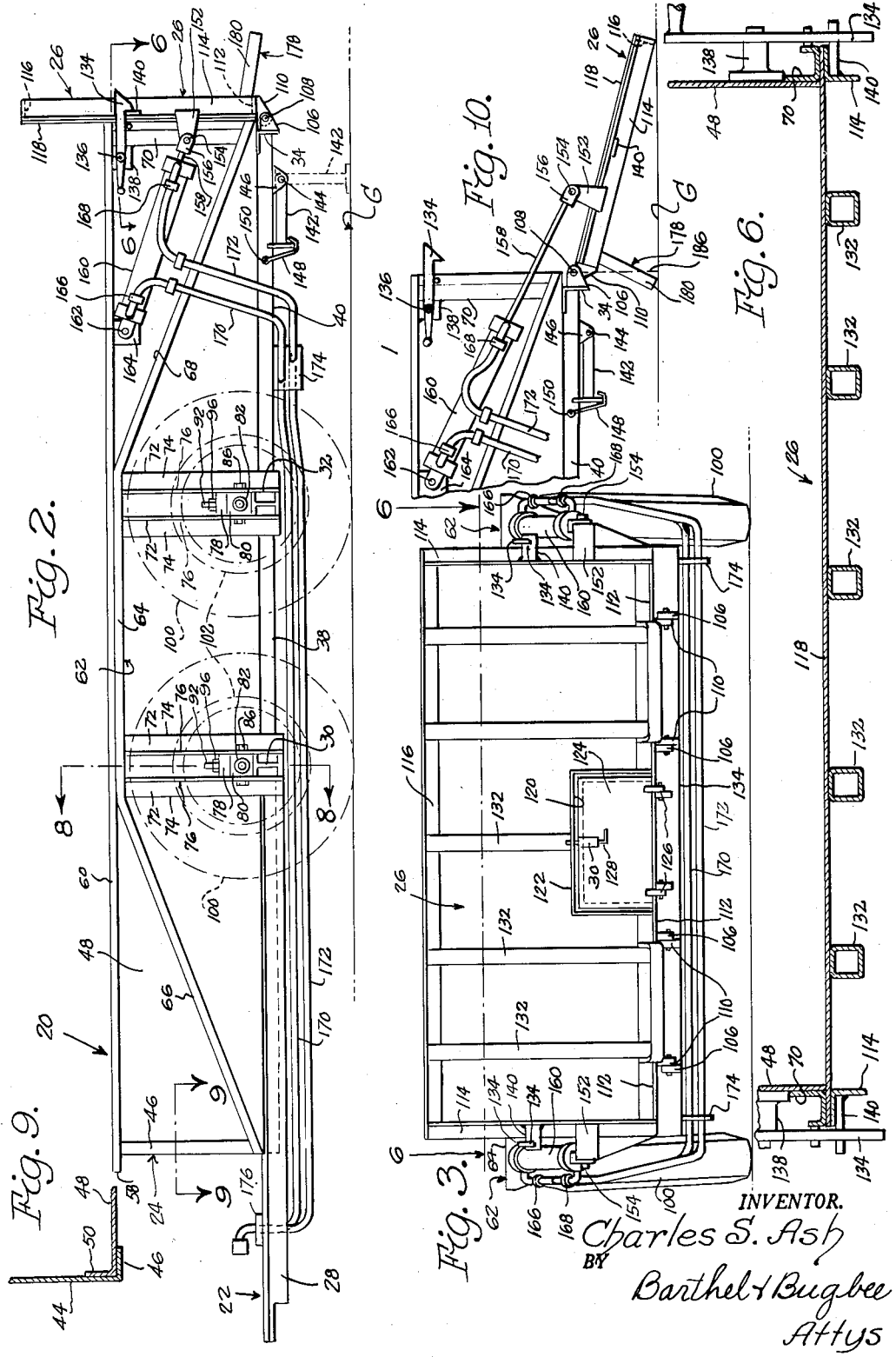

June 12, 1956     C. S. ASH     2,750,226
RAMP TRAILER
Filed June 15, 1953     3 Sheets-Sheet 3
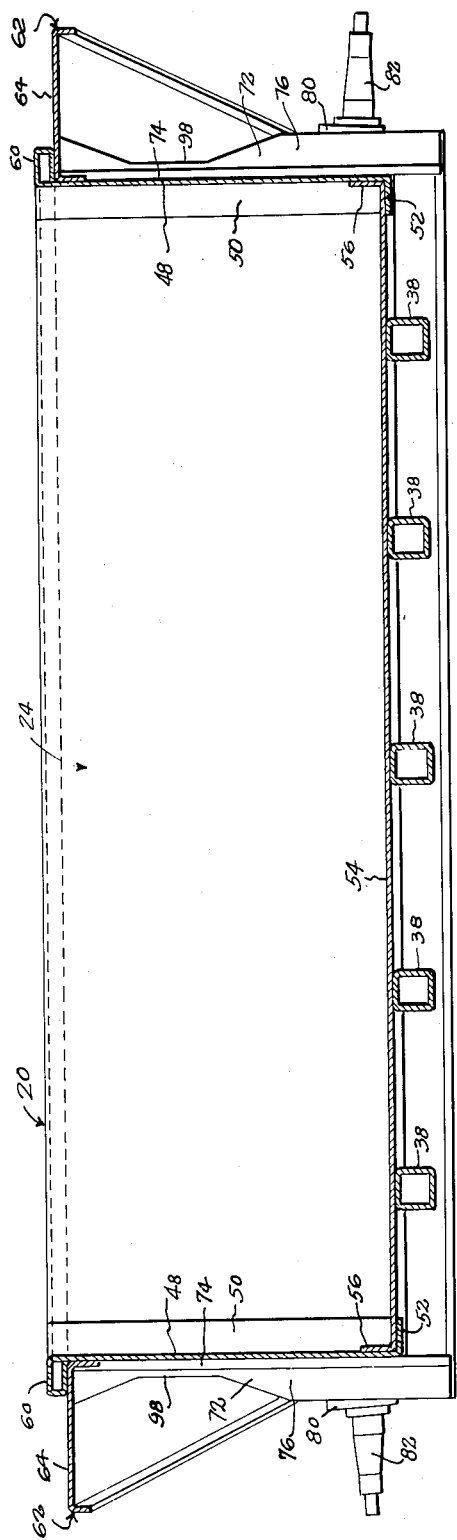
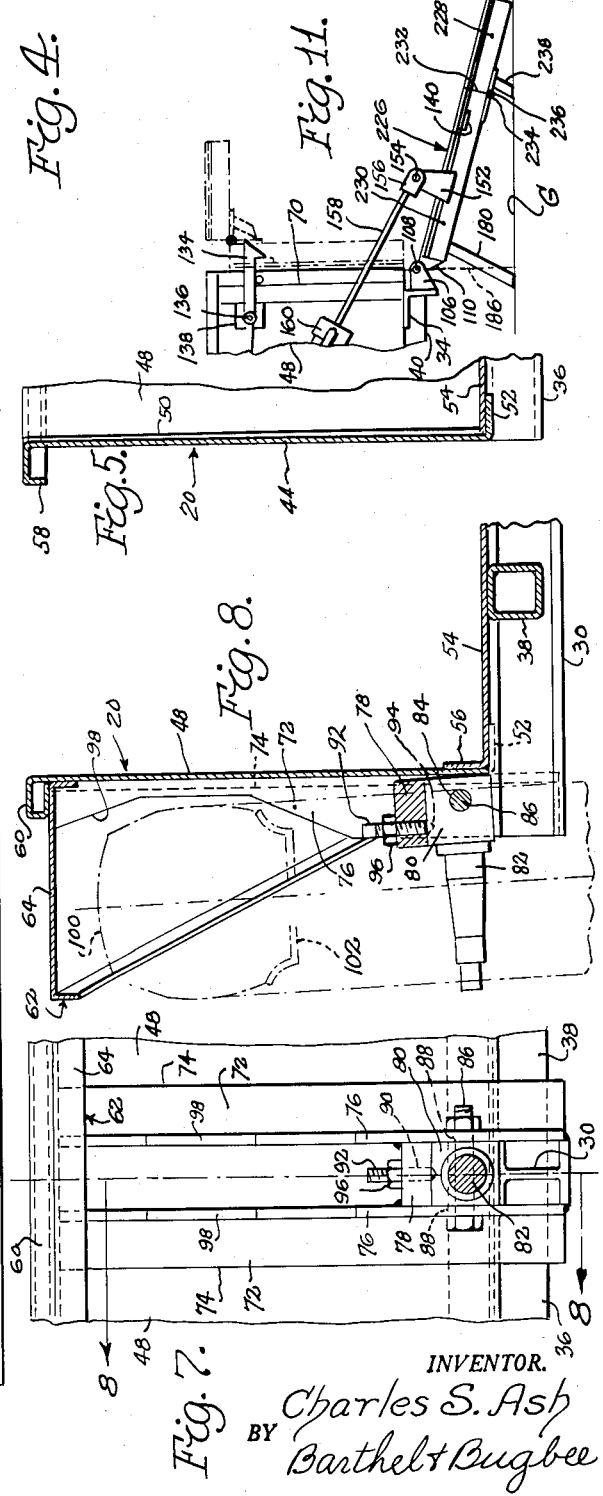
INVENTOR.
Charles S. Ash
BY Barthel & Bugbee
Attys

United States Patent Office 2,750,226
Patented June 12, 1956

2,750,226
RAMP TRAILER

Charles S. Ash, Detroit, Mich.

Application June 15, 1953, Serial No. 361,636

4 Claims. (Cl. 296—61)

This invention relates to trailers and, in particular, to means for facilitating the loading and unloading of the cargo from the trailer.

One object of this invention is to provide an improved trailer wherein the tail gate is swingable downwardly into an inclined position to serve as a loading ramp for loading the cargo, the tail gate being preferably provided with motors, such as pressure-fluid-operated cylinders and pistons for swinging the tail gate upward and downward.

Another object is to provide an improved trailer of the foregoing character wherein the tail gate is provided with a bumper which projects rearwardly in the raised position of the tail gate to protect the vehicle, and which projects downwardly in the lowered position of the tail gate to serve as a support for the forward edge of the tail gate, the rearward edge of which rests on the ground.

Another object is to provide an improved trailer of the foregoing character wherein the tail gate is hinged intermediate its upper and lower edges so as to serve as a ramp for a trailer floor placed higher than usual, the tail gate at its intermediately-hinged position being preferably supported by an additional foot or leg secured to the tail gate.

Other objects and advantages of the invention will become apparent during the course of the following description of the accompanying drawings, wherein:

Figure 1 is a top plan view of a trailer according to one form of the invention, with the tail gate raised;

Figure 2 is a side elevation of the trailer shown in Figure 1;

Figure 3 is a rearward end elevation of the trailer shown in Figures 1 and 2;

Figure 4 is a vertical cross-section taken along the line 4—4 in Figure 1;

Figure 5 is an enlarged fragmentary longitudinal section taken along the line 5—5 in Figure 1;

Figure 6 is a horizontal section taken along the line 6—6 in Figure 3;

Figure 7 is an enlarged fragmentary view of the central portion of Figure 2;

Figure 8 is a vertical section taken along the line 8—8 in Figure 7;

Figure 9 is a fragmentary horizontal section taken along the line 9—9 in Figure 2;

Figure 10 is a view of the rearward portion of Figure 2 with the tail gate lowered into its ramp position, with the bumper serving as a support; and Figure 11 is a fragmentary side elevation of the rearward portion of a trailer similar to Figure 2, but equipped with a modified tail gate, shown in its lowered position.

Hitherto, the loading of heavy objects, equipment and cargoes into trailers has been rendered difficult without the provision of a loading platform or external ramp, or without special loading equipment, such as hoists, lift trucks or the like. Moreover, prior trailers for this purpose have required elaborate structural reinforcements and frames in order to strengthen the vehicle sufficiently to sustain such heavy cargoes.

The trailer of the present invention is provided with a tail gate which in its raised position serves its usual function for closing the rearward end of the trailer body. In its lowered position, however, the tail gate assumes an inclined position with its rearward edge resting on the ground, thereby serving as a self-contained loading ramp in that position. Moreover, a bumper is attached to the tail gate in such a position as to protect the rearward end of the vehicle during travel or parking, yet to additionally support the forward edge of the tail gate and the rearward end of the trailer when the tail gate is in its lowered or loading ramp position. A modification shown in Figure 11 provides intermediate hinging of the tail gate for adaptation to higher floor levels, additional support being provided adjacent the intermediate hinges.

Referring to the drawings in detail, Figures 1 and 2 show a trailer, generally designated 20, according to one form of the invention, as consisting generally of a frame 22 on which is mounted a body 24 having an open rearward end equipped with a tail gate 26. The frame 22 consists of converging draw members 28 of angle cross-section secured at their rearward ends to a forward cross member 30 of I-beam construction. The frame 22 also includes an intermediate cross member 32 similar to the forward cross member 30 and a rearward cross member 34 of angle cross-section. The frame further includes multiple longitudinal forward, intermediate and rearward tubular members 36, 38 and 40 spaced apart from one another. The forward ends of the forward tubular members 36 are welded to the converging draw bars 28 while their rearward ends are notched out to receive the upper flange of the forward cross member or I-beam 30 and butt-welded thereto in the channel thereof. The opposite ends of the intermediate tubular members 38 are similarly notched out and similarly butt-welded at their opposite ends in the facing channels of the I-beams 30 and 32. The rearward tubular members 40 are similarly notched out and butt-welded at their forward ends in the channel of the I-beam or intermediate cross member 32 and are butt-welded at their rearward ends to the rearward cross member or angle member 34. The converging draw members 28 at their junction are welded together and provided with a hole 42 for receiving the usual coupling (not shown) by which the trailer 20 is connected to a towing vehicle, such as a tractor.

The body 24 consists of a forward panel 44 having vertical side flanges 46 and side panels 48 with vertical end flanges 50 interfitting with the flanges 46 and forward panel 44 (Figure 9) and welded to one another. The side panels 48 also have horizontal bottom flanges 52 (Figure 4) which extend beneath a bottom or floor panel 54 disposed at right angles to the forward panel 44 and preferably integral therewith or at least welded thereto. The bottom or floor panel 54 has vertical side flanges 56 which interfit with and are welded to the horizontal flanges 52 and side panels 48 (Figure 4). The forward and side panels 44 and 48 have rolled-over upper tubular edge portions 58 and 60 respectively, which further strengthen the body 24 and their respective panels 44 and 48 at the upper periphery of the body 24. The tubular members 36, 38 and 40 are also preferably welded at intervals to the floor panel 54.

The side panels 48 are reinforced and the body 24 generally strengthened by cantilever members, generally designated 62, having rectangular top portions 64 and tapering or triangular forward and rearward portions 66 and 68 bent downwardly to the forward and rearward corners respectively of the body 24 (Figures 1 and 2). These cantilever members 62 also serve as fenders or mud guards for the wheels, as described below. The side panels 48 at their rearward ends are also reinforced by vertical members 70 of approximately J-shaped cross-section (Figure 6) welded thereto.

Secured to the side panels 48 at approximately the forward and rearward ends of the rectangular top portion 64 of the cantilever members 62 are spaced pairs of parallel angle members 72 with their inner flanges 74 facing in opposite directions and secured as by welding to the body panels 48. The outer flanges 76 of each pair, on the other hand, face one another and project outwardly parallel to one another and perpendicular to the side panel 48 to which they are attached. These vertical angle members 72 of each pair are mounted in and engage the opposite sides of each I-beam or cross-member 30 and 32. The I-beams 30 and 32 extend outwardly between the outer flanges 76 of each pair and are disposed on opposite sides of a bridge block or bar 78 (Figures 2, 7 and 8) which is welded thereto at its opposite ends.

Each bridge bar 78 is parallel to but spaced above the top flanges of the I-beams or cross-members 30 and 32 and the space thus provided receives the cubicle base 80 of a stub axle 82 (Figure 8) integral therewith and drilled horizontally as at 84 to receive an anchor bolt 86. The anchor bolt 86 passes through the hole 84 and through aligned holes 88 in the flanges 76 of the angle members 72. Each bridge bar 78 is provided with a vertical threaded hole 90 which receives a pointed set screw 92, the pointed end of which is seated in a recess 94 in the upper end of the base block 80. A lock nut 96 holds the set screw 92 in its adjusted position. From Figure 8, it will be observed that the axles 82 are tilted slightly relatively to the horizontal, so that they are actually inclined downwardly and outwardly at slight angles of approximately two degrees. When the vehicle is fully loaded with a heavy load, the axles 82 straighten out to approximately horizontal positions. The upper portions of the flanges 76 of the angle members 72 are cut away as at 98 to provide clearance for the tire 100 of a wheel 102, the hub 104 of which is rotatably mounted upon the axle 82, as shown in Figures 1, 2 and 8. There are two pairs of wheels mounted in this manner, one pair at the opposite ends of each of the I-beams or cross members 30 and 32. By means of this construction, the axles 82 are supported in part by the cross members 30 and 32, and are quickly and easily removed by removing the anchor bolts 86 and set screws 92 for repair or replacement purposes.

Welded or otherwise secured to the vertical flange of the rearward cross member 34 are laterally-spaced ears or hinge brackets 106 which support pivot pins 108 to which corresponding brackets 110 are pivotally connected. The hinge brackets 110 are welded or otherwise secured to the bottom edge member 112 of the tail gate 26 (Figures 2 and 3). The latter also has vertical side edge members 114 and a top edge member 116. These edge members carry a tail gate panel 118 welded thereto.

The tail gate 26 also has an auxiliary opening 120 therein (Figure 3) surrounded by a frame 122 and closed by an auxiliary door 124. The latter is hinged as at 126 to the lower edge member 112 of the tail 26 and is locked in its closed position by a sliding bolt 128 reciprocable in a suitably bored boss 130 and engaging a hole in the frame 122. The tail gate 26 is additionally reinforced by vertical tubular members 132 welded at their opposite ends to the top and bottom edge members 116 and 112 respectively (Figures 3 and 6). The tail gate 26 is latched in its raised position by hooked latch levers 134 (Figures 2 and 10) pivoted as at 136 to base plates 138 which in turn are welded to the body side panels 48, the outer ends of the latch levers 134 being hooked over latch bars or tongues 140 projecting outwardly from the side edge members 114 and welded thereto (Figure 3).

The body 24 is sustained in a horizontal position by swinging legs 142 (Figures 1 and 2) pivoted as at 144 to brackets 146 secured to the outermost tubular members 40 and held in their raised positions by latch hooks 148 also pivoted at 150 to the same horizontal members 40. Secured as by welding to the side edge members 114 of the tail gate 26 are arms 152 carrying pivot pins 154 to which are attached clevises 156 on the ends of pistons 158. The pistons 158 reciprocate in double-acting fluid pressure cylinders 160 mounted in inclined positions on the body panels 48 and pivoted as at 162 to mounting plates 164 welded to the side panels 48. Connections 166 and 168 are provided at opposite ends of the cylinders 166 for the attachment of fluid service pipes 170 and 172 respectively, these being supported in brackets 174 and a cross plate 176 at opposite ends of the vehicle (Figure 2). The service pipes 170 and 172 are approximately T-shaped (Figure 1) and extend to opposite sides of the vehicle through the cylinders 166 mounted on opposite sides thereof.

Secured to the lower edge member 112 of the tail gate 26 on opposite sides of the auxiliary door frame 122 is a bumper assembly, generally designated 178, consisting of two spaced bumpers 180 (Figure 1) of partially rectangular and partially triangular outline composed of metal bars bent in that shape and having their opposite ends welded or otherwise secured to the member 112. The bumpers 180 are strengthened by brace bars 182 which further increase their rigidity and which are welded at the opposite ends thereof to the outer bumper portion 184 and tail gate cross member 112 respectively.

In the operation of the invention, let it be assumed that the tail gate 26 is in its raised position, latched in place by the latch levers 134 and with the bumpers 180 projecting rearwardly to protect the rearward end of the vehicle in its traveling position (Figure 2). If it is desired to lower the tail gate, the operator lifts the latch levers 134 and operates the valve (not shown) connected to the hydraulic pump and hydraulic circuit (also not shown) to supply pressure fluid to the service pipe 170 and to exhaust fluid from the service pipe 172, causing the pistons 158 to move downward as the cylinders 160 pivot about their pivot pins 162. When the tail gate swings downward to the position shown in Figure 10, the bumpers 180 swing underneath a vertical plane 186 through the pivot pins 108 of the tail gate 26, coming to rest upon the ground G simultaneously with the arrival of the upper edge member 116 of the tail gate at the ground G. The cargo, whatever its nature, is then conveyed up the inclined ramp formed by the tail gate 26 onto the floor 54 of the body 24, thus loading the trailer 20 with ease and rapidity.

After the trailer has been loaded, the tail gate 26 is raised by admitting pressure fluid to the service pipe 172 and exhausting fluid from the pipe 170 to cause the pistons 158 to move upward, drawing with them the tail gate 26 by means of its connection through the arms 152. At the same time, the bumpers 180 swing substantially through a slightly greater than semi-circular path past the vertical plane 186 previously mentioned and come to rest in the rearwardly-projecting approximately horizontal positions shown in Figures 3 and 9.

If the trailer is coupled to a tractor, it can be tilted upward or downward by the hydraulic lifting mechanism commonly associated with tractors for raising and lowering the draw bar. If, however, the trailer is standing alone, and it is desired to prevent the rearward end from tilting downward when weight is put upon it and when the tail gate is raise, the legs 142 may be swung downward by unlatching the latch hooks 148, causing the legs 142 to assume the vertical positions shown in Figure 2. When the tail gate 26 has been fully raised, the latch levers 134 are pushed upward by the inclined edges thereof serving as cams in riding over the latch bars or tongues 140, dropping into place behind the latter and locking the tail gate 26 in its raised position.

The modified tail gate, generally designated 226, shown in Figure 11 is similar in most respects to the tail gate 26 of Figures 1 to 10 inclusive and similar parts are designated by similar reference numerals increased by 200. The tail gate 206 differs from the tail gate 26 in being divided into upper and lower portions 228 and 230 meeting one another along the junction 232 where hinges 234 with pivot pins 236 are provided to pivotally interconnect the portions 228 and 230 of the tail gate. An additional pair of auxiliary legs 238 is provided on the upper portion 228 and provides additional support to the tail gate 226 when it is lowered, the auxiliary legs 238 being sufficiently shorter than the main legs or bumpers 180 to adapt them to the shorter distance to the ground G.

The operation of the modification shown in Figure 11 is identical with that described in connection with Figures 1 to 10 inclusive, except that the upper portion 228 of the tail gate 226 pivots relatively to the lower portion 230 thereof, as shown by the dotted lines in the upper part of Figure 11. This construction enables the tail gate to be used as a ramp for a trailer having a floor higher from the ground than the floor 54 of the trailer 20 of Figures 1 to 10 inclusive.

What I claim is:

1. In a trailer comprising a frame structure and an open-ended body structure on said frame structure having a floor, a tail gate having a lower edge pivotally connected to one of said structures and an upper edges, said tail gate being swingable selectively into a vertical position closing the open end of said body structure and into an inclined position with its upper edge engaging the ground and with its lower edge approximately at the level of said floor whereby said tail gate in its lowered position forms a loading ramp for said trailer, and a bumper on said tail gate near the lower edge thereof positioned to project rearwardly in the raised position of said tail gate and to project downwardly to the ground in the lowered position of said tail gate.

2. In a trailer comprising a frame structure and an open-ended body structure on said frame structure having a floor, a tail gate having a lower edge pivotally connected to one of said structures and an upper edge, said tail gate being swingable selectively into a vertical position closing the open end of said body structure and into an inclined position with its upper edge engaging the ground and with its lower edge approximately at the level of said floor whereby said tail gate in its lowered position forms a loading ramp for said trailer, and a bumper on said tail gate near the lower edge thereof positioned to project rearwardly and silghtly downwardly in the raised position of said tail gate and to project downwardly to the ground and slightly forwardly in the lowered position of said tail gate.

3. In a trailer comprising a frame structure and an open-ended body structure on said frame structure having a floor, a tail gate having a lower edge pivotally connected to one of said structures and an upper edge, said tail gate being swingable selectively into a vertical position closing the open end of said body structure and into an inclined position with its upper edge engaging the ground and with its lower edge approximately at the level of said floor whereby said tail gate in its lowered position forms a loading ramp for said trailer, and a bumper on said tail gate near the lower edge thereof positioned to project rearwardly and slightly downwardly in the raised position of said tail gate and to project downwardly to the ground and slightly forwardly of a vertical plane passing through the pivotal axis of said tail gate connection to said structure in the lowered position of said tail gate.

4. In a trailer comprising a frame structure and an open-ended body structure on said frame structure having a floor, a tail gate having a lower edge pivotally connected to one of said structures and an upper edge, said tail gate being swingable selectively into a vertical position closing the open end of said body structure and into an inclined position with its upper edge engaging the ground and with its lower edge approximately at the level of said floor whereby said tail gate in its lowered position forms a loading ramp for said trailer, said tail gate having a lower portion and an upper portion pivotally connected to said lower portion, a first auxiliary support projecting from said upper portion adjacent its pivotal connection to said one structure into engagement with the ground in the lowered position of said tail gate, and a second auxiliary support secured to one of said tail gate portions adjacent its pivotal connection to the other tail gate portion.

References Cited in the file of this patent

UNITED STATES PATENTS

| 1,723,469 | De Roos | Aug. 6, 1929 |
| 2,136,010 | Housdorfer | Nov. 8, 1938 |
| 2,215,631 | Young | Sept. 24, 1940 |
| 2,239,029 | Barrett | Apr. 22, 1941 |
| 2,261,099 | Fairbanks | Oct. 28, 1941 |
| 2,387,093 | Schmied | Oct. 16, 1945 |
| 2,420,794 | O'Neill | May 20, 1947 |
| 2,635,845 | Benjamin | Sept. 29, 1953 |

FOREIGN PATENTS

| 718,231 | France | Nov. 4, 1931 |